Patented Jan. 27, 1942

2,271,363

UNITED STATES PATENT OFFICE 2,271,363

REFRACTORY FERROUS CHROMITE CASTING

Theodore E. Field, Louisville, Ky., assignor to Corhart Refractories Company, Louisville, Ky., a corporation of Delaware No Drawing. Application October 11, 1939, Serial No. 299,038

7 Claims. (Cl. 106—66)

This invention relates to the manufacture of castings which are refractory to heat and very resistant to attack by chemical fluxes such as molten glass and are therefore useful in glass melting apparatus. The method and techniques to be employed in manufacturing such castings are substantially those disclosed in U. S. Patent #1,615,750 to Fulcher.

The use of chromic oxide ($Cr_2O_3$) as an ingredient in glass refractories has been proposed and in combination with alumina ($Al_2O_3$) it is known to be resistant as a crystal phase to corrosion by fluxes. The inclusion of alumina has the advantage of cheapening the batch but unfortunately the resistance to corrosion progressively decreases as the content of alumina is increased. This is especially objectionable because of the strong coloring action of $Cr_2O_3$ on clear glasses. On the other hand it is extremely difficult as well as costly to cast $Cr_2O_3$ without some additional substance.

I have discovered however that iron oxide can be added to increase the ease of melting and to cheapen the batch without producing a decrease in resistance. Iron oxide itself is not resistant to corrosion by glass but in the presence of $Cr_2O_3$ and the reducing conditions of the electric furnace with graphite electrodes, the phase $FeO.Cr_2O_3$ is produced and this, according to test, is just as resistant as $Cr_2O_3$ alone. This is somewhat surprising in view of the relatively poor showing of fused chrome ore in which ferrous chromite is also a major constituent or of chrome ore with over 50% alumina. The relatively poor resistance of these as cast refractories is apparently associated with the simultaneous presence of both magnesia and alumina in the batch. In any case, tests have shown cast ferrous chromite from two to three times as resistant to glass as cast chrome ore of good grade.

If more iron oxide than is required to convert all the $Cr_2O_3$ to $FeO.Cr_2O_3$ is used, the resistance falls off rapidly and bad coloring action on the glass results. On the other hand if less iron oxide is used than is required for the formation of $FeO.Cr_2O_3$ then the resistant $Cr_2O_3$ phase is also present and the resistance is preserved. However, at least 10% iron oxide is required to produce a mixture which is readily fusible and from the standpoint of economy, the greater the amount of iron oxide, the cheaper the batch. As a rule I prefer therefore, to use a little less than the theoretical amount of iron oxide required to form $FeO.Cr_2O_3$ completely.

As raw materials the chrome green oxide produced commercially as a paint pigment is suitable without the necessity for fine grinding and color control. The iron oxide may be either the black magnetic $Fe_3O_4$ or the red $Fe_2O_3$ or mixtures of the two. It is in fact a distinct advantage to have excess oxygen available since one of the difficulties otherwise is the excessive reduction of $Cr_2O_3$ melts by the graphite electrodes. Any materials which will give equivalent compositions can be equally well substituted and in particular might be mentioned the possibility of using reoxidized ferro-chrome of proper composition.

As suitable batches for very resistant refractories according to the above principles, the following may be cited:

*Batch*

|    | $Fe_2O_3$ | $Fe_3O_4$ | $Cr_2O_3$ |
|----|-----------|-----------|-----------|
| #1 | 35        |           | 65        |
| #2 |           | 30        | 70        |
| #3 | 10        |           | 90        |

In the following claims I use the term "heat cast" to identify a refractory which forms from the solidification of molten material, thereby distinguishing it from a wet cast product.

What I claim is:

1. A heat cast refractory consisting essentially of ferrous chromite and substantially free from compounds other than those of the metals forming said chromite.

2. A heat cast refractory consisting essentially of ferrous chromite and excess chromic oxide and substantially free from compounds other than those of the metals forming said chromite.

3. A heat cast refractory containing from 10 to 40% iron oxide by chemical analysis, the remainder being substantially all chromium oxide.

4. As a batch for a heat cast refractory, a mixture of from 10 to 40% ferrosoferric oxide, the remainder being substantially all chrome green oxide.

5. As a batch for a heat cast refractory, a mixture of from 10 to 40% ferric oxide, the remainder being substantially all chrome green oxide.

6. As a batch for a heat cast refractory a mixture containing 10 to 40% ferric and ferrosoferric oxides, the remainder being chrome green oxide.

7. A heat cast refractory containing substantial percentages of chromic oxide and oxide of iron and being free of any substantial percentage of alumina and magnesia.

THEODORE E. FIELD.